(12) United States Patent
Sonnerat et al.

(10) Patent No.: US 9,379,455 B2
(45) Date of Patent: Jun. 28, 2016

(54) ANTENNA CIRCUIT USING MULTIPLE INDEPENDENT ANTENNAS SIMULTANEOUSLY THROUGH A SINGLE FEED

(71) Applicants: STMICROELECTRONICS SA, Montrouge (FR); STMICROELECTRONICS (CROLLES 2) SAS, Crolles (FR)

(72) Inventors: Florence Sonnerat, St ferreol (FR); Romain Pilard, Goncelin (FR); Frédéric Gianesello, Saint Pierre d'Albigny (FR); Cédric Durand, St Martin d Heres (FR)

(73) Assignees: STMICROELECTRONICS SA, Montrouge (FR); STMICROELECTRONICS (CROLLES 2) SAS, Crolles (FR)

( * ) Notice: Subject to any disclaimer, the term of this patent is extended or adjusted under 35 U.S.C. 154(b) by 301 days.

(21) Appl. No.: 14/058,515

(22) Filed: Oct. 21, 2013

(65) Prior Publication Data
US 2014/0145897 A1  May 29, 2014

(30) Foreign Application Priority Data
Nov. 23, 2012 (FR) ...................... 12 61159

(51) Int. Cl.
*H01Q 11/00* (2006.01)
*H04B 1/40* (2015.01)
(Continued)

(52) U.S. Cl.
CPC ............ *H01Q 21/30* (2013.01); *H01Q 1/243* (2013.01); *H01Q 5/371* (2015.01); *H01Q 9/42* (2013.01);

*H01Q 21/0087* (2013.01); *H01Q 21/28* (2013.01); *H04B 1/0057* (2013.01); *Y10T 29/49018* (2015.01)

(58) Field of Classification Search
CPC .............................. H04B 1/0057; H01Q 21/30
USPC .............. 343/853; 29/601; 333/24; 455/208; 370/297
See application file for complete search history.

(56) References Cited

U.S. PATENT DOCUMENTS

| 2003/0201939 A1 | 10/2003 | Reece et al. |
| 2011/0014958 A1* | 1/2011 | Black ............... H01Q 1/243 455/575.7 |

FOREIGN PATENT DOCUMENTS

| EP | 1732160 | 12/2006 |
| EP | 1983609 | 10/2008 |
| GB | 2422723 | 8/2006 |

OTHER PUBLICATIONS

Ikonen et al. ("Multi-feed RF front-ends and cellular antennas for next generation smartphones" 2011 EPCOS AG and Pulse Electronics) Slideshow.*

(Continued)

*Primary Examiner* — Dameon E Levi
*Assistant Examiner* — Ricardo Magallanes
(74) *Attorney, Agent, or Firm* — Allen, Dyer, Doppelt, Milbrath & Gilchrist, P.A.

(57) ABSTRACT

An antenna circuit includes a first antenna tuned to a first fundamental frequency and a second antenna tuned to a second fundamental frequency different from the first fundamental frequency. A first filter has a first terminal connected to the first antenna and attenuates the frequency components outside of a band defined by the first fundamental frequency or its harmonics. A second filter has a first terminal coupled to the second antenna and attenuates the frequency components outside of a band defined by the second fundamental frequency or its harmonics. A passive recombination element couples the second terminals of the two filters to a common terminal.

12 Claims, 3 Drawing Sheets

(51) Int. Cl.
*H01Q 17/00* (2006.01)
*H04L 5/00* (2006.01)
*H01Q 21/30* (2006.01)
*H01Q 21/00* (2006.01)
*H01Q 1/24* (2006.01)
*H01Q 9/42* (2006.01)
*H01Q 21/28* (2006.01)
*H04B 1/00* (2006.01)
*H01Q 5/371* (2015.01)

(56) References Cited

OTHER PUBLICATIONS

Ikonen et al., "Multi-Feed RF Front-Ends and Cellular Antennas for Next Generation Smartphones", Indie, Pulse Electronics, No Date Available, pp. 1-11.

\* cited by examiner

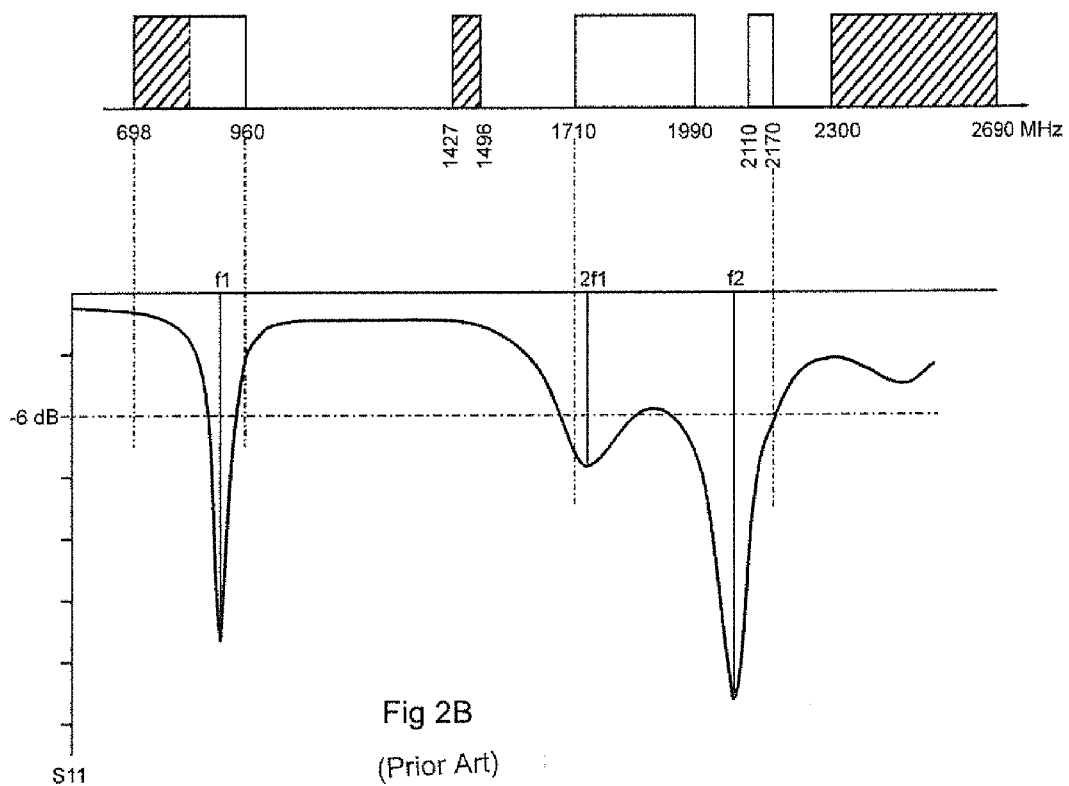
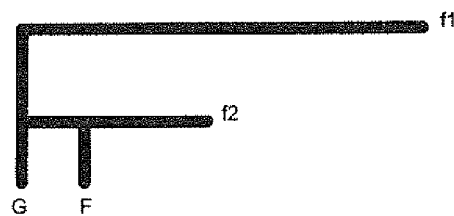

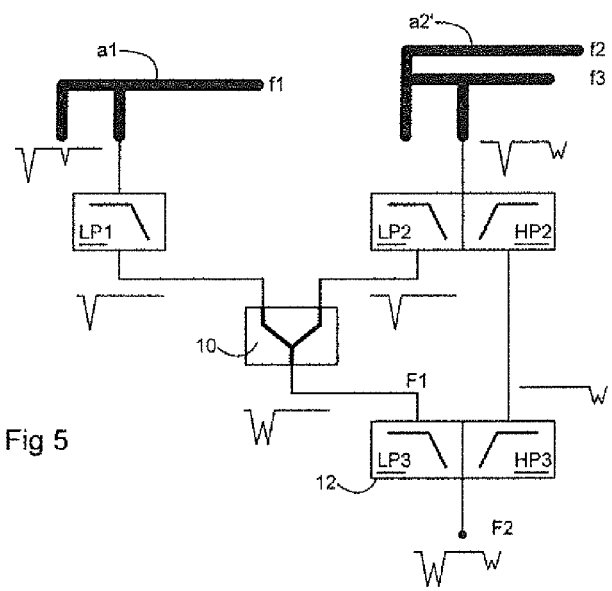
Fig 5
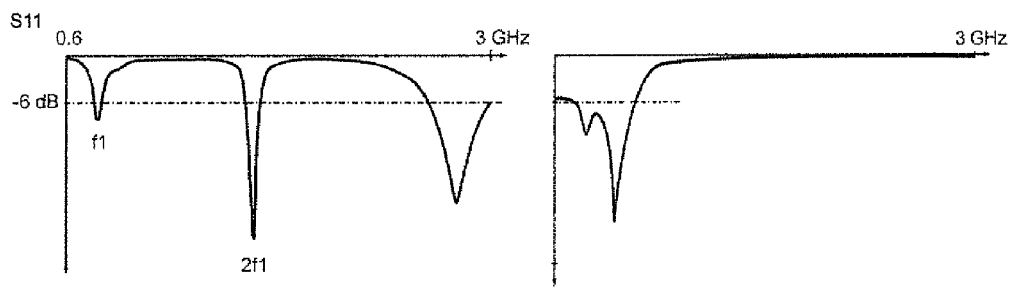
Fig 6A
Fig 6C
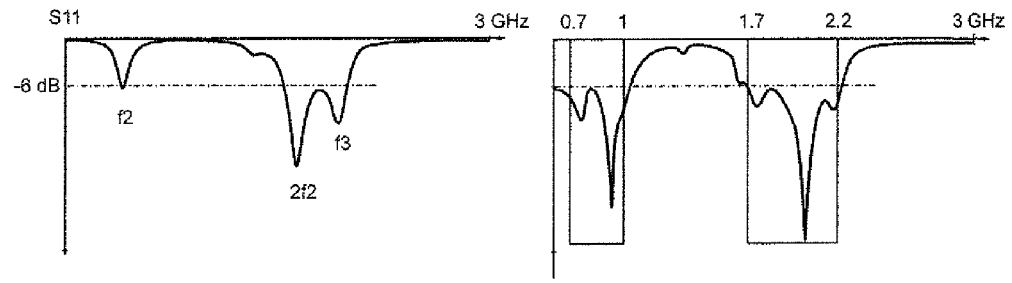
Fig 6B
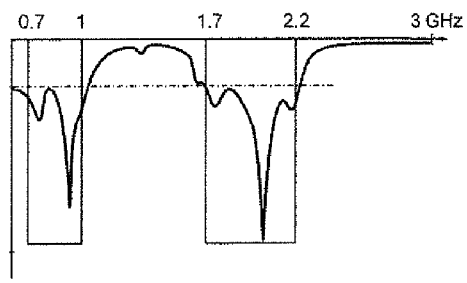
Fig 6D

ANTENNA CIRCUIT USING MULTIPLE INDEPENDENT ANTENNAS SIMULTANEOUSLY THROUGH A SINGLE FEED

FIELD OF THE INVENTION

The invention relates to antenna circuits for use over several standard frequency bands, especially in the field of mobile telephony.

BACKGROUND OF THE INVENTION

Mobile phones are designed to operate in multiple radiofrequency bands to be compatible with existing telecommunication standards (e.g., GSM, 3G, WCDMA, LTE or 4G). These standards may vary from country to country.

FIG. 1 shows the bands used by the 3G and LTE standards. The bands in white are those of the 3G standard, i.e., 824-960 MHz, 1710-1990 MHz, and 2110-2170 MHz. The shaded bands are those added by the LTE standard, i.e., 698-824 MHz, 1427-1496 MHz, and 2300-2690 MHz.

At these frequencies, especially in the 824-960 MHz band, the antennas have a relatively narrow useful bandwidth. The useful bandwidth is about 80 MHz, which causes difficulties in the design of broadband antennas.

FIG. 2A schematically shows a physical structure of an antenna that can cover all bands of the 3G standard. The antenna, called IFA (Inverted-F Antenna), is in the form of an "F" with two legs. One leg G forms the ground terminal and the other leg F forms the antenna's feed terminal. The two arms, which are of different lengths, are tuned on two conveniently chosen frequencies. Frequency f1 is for the longer arm and frequency f2 for the shorter arm.

FIG. 2B is a graph illustrating an exemplary graph of the reflection coefficient S11 of an IFA antenna as a function of frequency. The matching of the antenna is a maximum when the coefficient S11 is a minimum. It is considered that the matching of the antenna is sufficient when S11<−6 dB.

The frequency f1 is selected at the center of the 824-960 MHz band. The coefficient S11 exhibits a dip around this frequency, and remains below −6 dB over the major part of the band. The first harmonic 2f1 of frequency f1 happens to be at the beginning of the 1710-1990 MHz band, where the coefficient S11 has a new dip. The frequency f2 is selected so that the dip started at frequency 2f1 is maintained below −6 dB up to the end of the 2110-2170 MHz band.

To cover the missing bands in FIG. 1, one could consider adding properly sized arms to the IFA antenna of FIG. 2A. It turns out, however, that multiple-arm IFA antennas only operate properly if the gaps between the fundamental resonant frequencies are sufficiently large. As a result, IFA antennas do not have more than two arms. Another possibility is to use a parasitic grounded element to replace the second arm.

To cover all the bands, it has been proposed to use a tuning circuit that can modify the matching of an antenna to make it work over a larger number of frequency bands. This approach has the disadvantage of not changing the narrow-band nature of the antenna. A wider frequency band can thus be addressed, but all frequencies of the band may not be covered simultaneously.

In addition, the LTE standard provides, for increasing throughput, the ability to aggregate multiple paths that can be located anywhere in the standard bands. If the antenna tuning circuit technique were used in this situation, there would be a high likelihood that two aggregated paths be located in two bands not simultaneously covered by a same setting. As a result, one or more aggregated paths would be unusable.

Note that the low, 698-960 MHz band is particularly difficult to cover with a single antenna, since, as shown in FIG. 25, the antenna covers at most a band of about 80 MHz in this section. An IFA antenna could be provided, whose frequencies 2f1 and f2 are in the 698-960 MHz band, but the fundamental frequency f1, then on the order of 360 MHz, would require an oversized antenna arm and pose problems for integration into a mobile phone.

The article [Multi-Feed RF Front-Ends and Cellular Antennas For Next Generation Smartphones, Pekka Ikonen, Juha Ella Edgar Schmidhammer, Pasi Tikka, Prasadh Ramachandran, Petteri Annamaa], available on the website of Pulse Electronics, proposes an antenna circuit offering access to all standard bands through three separate feeds. Such an antenna circuit uses three independent RF processing paths, and specifically designed electronic circuits.

SUMMARY OF THE INVENTION

There is therefore a need for an antenna circuit providing simultaneous access to the standard bands through a single feed.

This need is addressed by an antenna circuit comprising a first antenna tuned to a first fundamental frequency; a second antenna tuned to a second fundamental frequency different from the first fundamental frequency; a first filter having a first terminal connected to the first antenna, and configured to attenuate the frequency components outside of a band defined by the first fundamental frequency or its harmonics; a second filter having a first terminal coupled to the second antenna, and configured to attenuate the frequency components outside of a band defined by the second fundamental frequency or its harmonics; and a first passive recombination element coupling the second terminals of the two filters to a first common terminal.

The antenna circuit may comprise a passive high-pass filter having a first terminal coupled to the second antenna, and a cut-off frequency higher than the second fundamental frequency; and a second passive recombination element coupling the first common terminal and a second terminal of the high-pass filter to a second common terminal forming a single feed of the antenna circuit.

The second antenna may be configured to have two tuning frequencies, respectively on the second fundamental frequency and a third fundamental frequency close to the first harmonic of the first or second fundamental frequency.

The second passive recombination element may be configured as a diplexer having a low-pass path on the side of the first common terminal and a high-pass path on the side of the high-pass filter.

The first and second fundamental frequencies may be selected in a frequency band of 698-960 MHz.

BRIEF DESCRIPTION OF THE DRAWINGS

Other advantages and features will become more clearly apparent from the following description of particular embodiments of the invention provided for exemplary purposes only and represented in the appended drawings, in which:

FIG. 1 illustrates the frequency bands used by 3G and LTE standards according to the prior art;

FIGS. 2A and 2B represent an IFA antenna and the graph of its reflection coefficient according to the prior art;

FIG. 5 schematically shows another embodiment of an antenna circuit including multiple antennas simultaneously accessible through a single feed according to the present invention; and FIGS. 6A to 6D are waveforms of the reflection coefficient at various points of the antenna circuit of FIG. 5.

DETAILED DESCRIPTION OF THE PREFERRED EMBODIMENTS

To cover an extended range of frequencies, the use of multiple independent antennas is provided, with each antenna tuned to a different frequency of the range. By adjusting the fundamental and harmonic frequencies of the antennas, it is possible to cover desired bands in the frequency range.

If all antennas are used together, it is not sufficient to connect them directly to a common feed. Indeed, mutual influences between the antennas are such that the antenna circuit would likely become inoperative. That is why, in a conventional multiple antenna circuit, antennas are independently switched on a single feed. The switching ensures isolation of the selected antenna from the other antennas.

In the illustrated embodiment, each antenna is isolated from the other antennas with the aid of a passive filter tuned to attenuate the frequency components outside the useful band of the antenna. The individual filtered paths associated with the antennas are then joined two-by-two by recombination elements, according to a tree topology, and end at a single feed. This allows simultaneous access to all useful bands of the antennas.

The filters and recombination elements are preferably bidirectional, which allows using the same antenna circuit for both transmission and reception, as would a conventional simple antenna.

Figure 3:
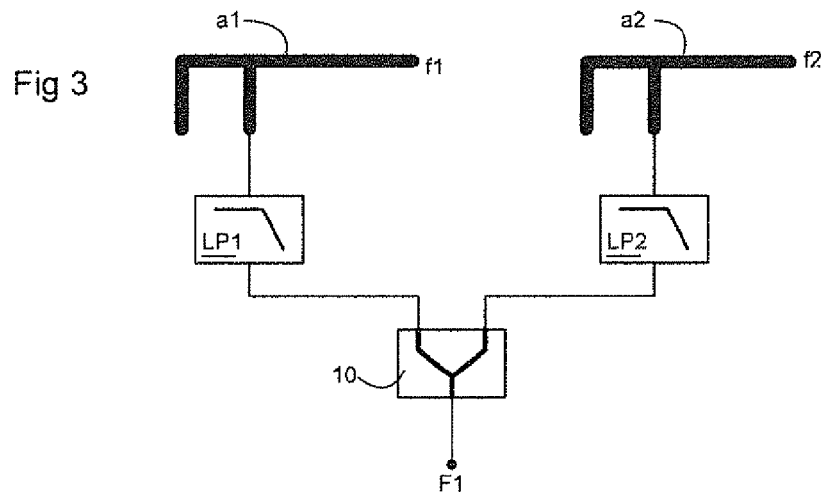
FIG. 3 schematically shows an embodiment of an antenna circuit including multiple antennas simultaneously accessible through a single feed according to the present invention.

FIG. 3 schematically shows an embodiment of an antenna circuit comprising two antennas derived from this principle. This embodiment is adapted, in particular, to cover a wide band that is difficult to cover with a single antenna, like the 698-960 MHz band of FIG. 1.

The antenna circuit includes two simple antennas a1 and a2, tuned to distinct fundamental frequencies f1 and f2. Each of the antennas a1 and a2 is connected to a first terminal of a passive filter LP1 and LP2, respectively. Each filter is designed to attenuate unwanted frequency components of the associated antenna.

With this configuration it may be desired, for example, to keep the fundamental frequencies and attenuate their harmonics. The filters are then low-pass filters with a cutoff frequency between the fundamental frequency and the first harmonic. The cutoff frequency is preferably as low as possible to increase the attenuation of the first harmonic and limit the mutual influence of the antenna with the other antennas. Satisfactory results are obtained with simple LC filters of order 2.

A passive recombination element 10 couples a second terminal of each of the filters LP1, LP2 to a common terminal F1, serving as a single feed to the shown antenna circuit. The element 10 is preferably a power splitter when the frequencies f1 and f2 are close, such as a Wilkinson divider. It is considered that the two frequencies are close when the antennas tuned to the two frequencies cover a band of a same frequency group. When the frequencies f1 and f2 are far apart, the element 10 is a diplexer. A diplexer is a combination of a low-pass filter and a high-pass filter.

Consider in this example that the frequencies are close and element 10 is a power splitter. The power splitter generally includes passive elements that limit its bandwidth.

Figure 4A:
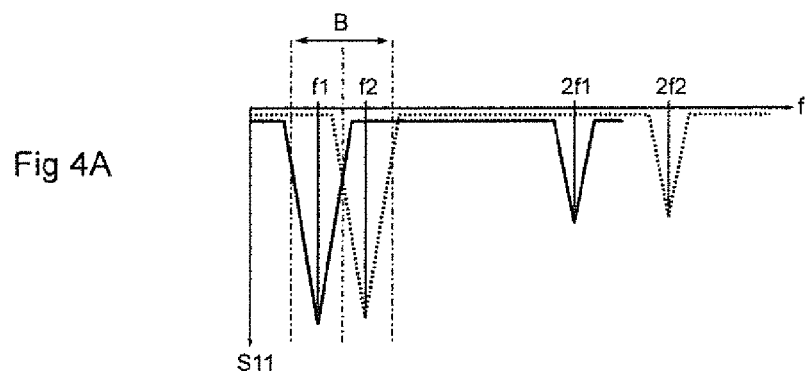
FIGS. 4A to 4C are waveforms of the reflection coefficient at various points of the antenna circuit of FIG. 3.
Figure 4B:
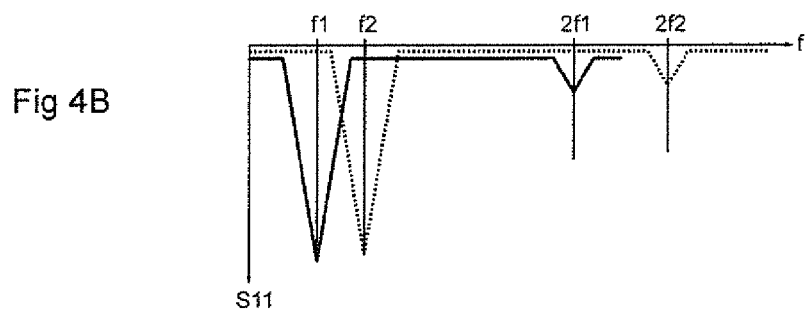
Figure 4C:
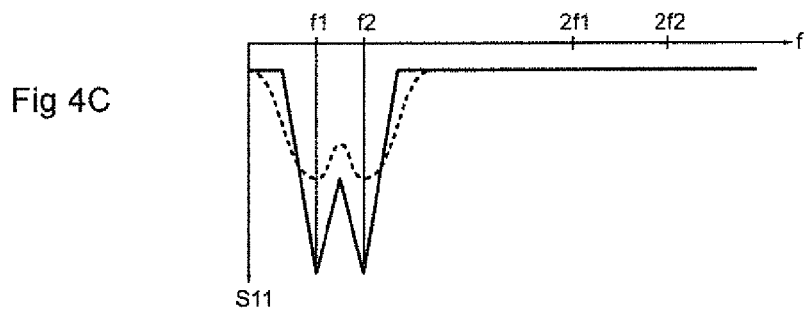

FIGS. 4A-4C illustrate operation of the antenna circuit of FIG. 3 in a configuration designed to cover a low frequency band B, for example the 698-960 MHz band. The frequencies f1 and f2 are distinct and located inside band B. They are, for example, in the center of the half-bands forming the band B.

FIG. 4A illustrates, in solid line, the S11 reflection characteristic measured on the node between the antenna a1 and filter LP1, and, in dashed line, the S11 characteristic measured on the node between the antenna a2 and filter LP2. These characteristics are shown as idealized and correspond to those that the antennas would have alone. In practice, a mutual influence between the two antennas persists. To apply the principle of separation of the frequency response of the antennas into several parts, a minimum isolation (between the antennas), for example −10 dB, is preferable when designing the antennas. A more realistic example will be given later.

As shown, these two characteristics exhibit a first dip at the fundamental frequency (f1, f2) and a second dip, less pronounced, at the first harmonic frequency (2f1, 2f2).

FIG. 4B illustrates the S11 characteristics measured on the nodes between the filters and the power splitter 10. The characteristics of FIG. 4A are observed with attenuated dips at harmonic frequencies 2f1 and 2f2. The attenuation depends on the order of filters LP1 and LP2, their topology, and their cut-off frequency.

FIG. 4C shows the S11 characteristic measured on feed F1. The solid-line curve corresponds to the idealized characteristic. Note that it corresponds to the sum of the characteristics of FIG. 4B, where the dips at harmonics 2f1, 2f2 have been removed due to the limited bandwidth of the power splitter 10.

The solid-line characteristic, subject to little attenuation with respect to the characteristics of FIG. 4A, corresponds to a situation where the components of the antenna circuit are ideal. In practice, the actual components, especially the inductors, include a parasitic series resistance, which reduces the quality factor. It is observed in practice that the characteristic of FIG. 4C is flatter and wider, as shown by dotted lines.

While a decrease of the quality factor is usually undesirable, it appears favorable in this case. Indeed, this phenomenon observed through the power splitter 10 could widen the band covered by the antenna circuit for a given number of antennas. Reverting to FIG. 2B, it can be noted that the conventional antenna switching technique, using two antennas of close frequencies, would fail to cover the 698-960 MHz band. Each antenna frequency offers coverage of a band of about 80 MHz while the desired band is 262 MHz. It would take at least three antennas to cover this band. The antenna circuit of FIG. 3 can cover the entire band with only two antennas.

FIG. 5 schematically shows an embodiment of an antenna circuit with two antennas, derived from the circuit of FIG. 3. The S11 characteristics measured on the nodes of the circuit are symbolized next to the nodes.

This configuration is intended to cover both the 698-960 MHz and 1710-2170 MHz bands. Compared to the IFA antenna of FIG. 2A, coverage of the additional 698-824 MHz band is sought.

Compared to the circuit of FIG. 3, simple antenna a2 is replaced by an IFA antenna a2', with a long arm tuned to the fundamental frequency f2, and a short arm tuned to a fundamental frequency f3. Filter LP2 is designed to pass the frequency f2 and attenuate frequencies 2f2 and f3. The circuit further comprises a passive high-pass filter HP2, a first terminal of which is connected to the antenna a2'. Filter HP2 is designed to attenuate the lower fundamental frequency f2. Its cut-off frequency is selected lower than the lowest of frequencies f3 and 2f2. Filters LP2 and HP2 form a diplexer.

A passive recombination element 12 couples the common terminal F1 and the second terminal of filter HP2 to a new common terminal F2 serving as a single feed of the antenna circuit. Both paths of the recombination element 12 see frequencies differing by a ratio close to 2, and element 12 is preferably a diplexer. The path on the side of terminal F1 is then a low-pass filter LP3, and the path on the side of filter HP2 is a high-pass filter HP3. The filter HP3 may have the same cut-off frequency as filter HP2, while filter LP3 may have a cut-off frequency equal to the highest of those of filters LP1 and LP2.

The diplexer 12, like the power splitter 10, offers an S11 characteristic on the common terminal F2, which is the filtered sum of the S11 characteristics present on its two other terminals.

FIGS. 6A-6C illustrate the S11 characteristics measured on nodes of FIG. 5, using real components in an exemplary antenna circuit designed to cover the 698-960 MHz and 1710-2170 MHz bands. The frequencies of antennas a1 and a2' are:

f1=775 MHz,
f2=925 MHz, and
f3=2000 MHz.

The following harmonics are thus considered:
2f1=1550 MHz, and
2f2=1900 MHz.

All filters in FIG. 5 are second order LC filters. The cut-off frequencies are:

LP1: 1550 MHz,
LP2: 1710 MHz,
10: limited bandwidth between 700 to 1000 MHz (when the element is loaded by the antennas),
HP2: 925 MHz,
LP3: 1710 MHz, and
HP3: 960 MHz.

FIG. 6A illustrates the S11 characteristic measured on the antenna a1. Note that this characteristic is different from that idealized in FIG. 4A. Indeed, the dip of the first harmonic 2f1 is more pronounced than that of the fundamental frequency f1. A dip is observed due to the second harmonic 3f1, offset upwards in frequency.

The fundamental frequency and two harmonics may be observed on the S11 characteristic. The fundamental frequency does not offer the best matching. The matching depends on the impedance profile of the antenna. In the shown S11 characteristic, the antenna is better matched to the harmonic frequency. This is not a problem in the present situation, as discussed below.

FIG. 6B illustrates the S11 characteristic measured at the IFA antenna a2'. Note that this characteristic is also different from that shown in FIG. 2B. Indeed the dips at fundamental frequencies f2 and f3 are less pronounced than the dip of harmonic frequency 2f2. The characteristic barely reaches −6 dB for the frequency f2, which would be insufficient if the antenna were used alone. The IFA antenna a2' differs from the IFA antenna of FIG. 2B by the ground plane and the deployed lengths. The size of the ground plane is a factor that modifies the relative matching levels of the harmonic frequencies with respect to the fundamental frequencies.

FIG. 6C shows the S11 characteristic measured at the common terminal F1. It comprises two dips at frequencies f1 and f2. The power splitter 10 aggregates the two dips from each antenna a1 and a2'. This produces a deeper dip having a wider band.

FIG. 6D illustrates the S11 characteristic measured at the feed F2. Despite its rough appearance, note that this characteristic remains below the desired threshold of −6 dB in the selected frequency bands, illustrated by rectangles.

Adding frequency bands to the antenna circuit simply requires the aggregation, according to a tree topology, of existing paths with paths created for new antennas. New paths for harmonic frequencies of existing antennas can also be created. For example, to add the 1427-1496 MHz band, harmonic frequency 2f1 can be isolated from the antenna a1 using a bandpass filter, and the new path be aggregated through a diplexer with the path that connects the filters HP2 and HP3. In this case, the filter HP3 is designed to have a cut-off frequency below 1550 MHz.

The antenna circuit of FIG. 5 is shown with low-pass and high-pass filters. It turns out that such filters were sufficient in the example shown to effectively isolate the desired frequency components of two antennas. In a more complex case with more than two antennas, or if harmonic frequencies need to be isolated, it may be necessary to use band-pass filters.

What is claimed is:

1. An antenna circuit comprising:
    a first antenna tuned to a first fundamental frequency;
    a second antenna configured to have two tuning frequencies, respectively a second fundamental frequency different from the first fundamental frequency and a third fundamental frequency close to a first harmonic of the first or second fundamental frequency;
    a first filter including a first terminal connected to said first antenna, and configured to attenuate frequency components outside of a band defined by the first fundamental frequency;
    a second filter including a first terminal coupled to said second antenna, and configured to attenuate the frequency components outside of a band defined by said second fundamental frequency;
    a first passive recombination element coupling the second terminals of said first and second filters to a first common terminal;
    a passive high-pass filter including first and second terminals, with the first terminal coupled to said second antenna, and having a cut-off frequency higher than the second fundamental frequency; and
    a second passive recombination element coupling the first common terminal and the second terminal of said high-pass filter to a second common terminal forming a single feed of the antenna circuit.

2. The antenna circuit according to claim 1, wherein the second passive recombination element is configured as a diplexer having a low-pass path on a side of the first common terminal and a high-pass path on a side of said high-pass filter.

3. The antenna circuit according to claim 1, wherein the first and second fundamental frequencies are within a range of 698-960 MHz.

4. The antenna circuit according to claim 1, wherein said first antenna comprises a first inverted-F antenna; and wherein said second antenna comprises a second inverted-F antenna.

5. An antenna circuit comprising:
    a first inverted-F antenna tuned to a first fundamental frequency;
    a second inverted-F antenna configured to have two tuning frequencies, respectively a second fundamental frequency different from the first fundamental frequency and a third fundamental frequency close to a first harmonic of the first or second fundamental frequency;

a first low pass filter including a first terminal connected to said first inverted-F antenna, and configured to attenuate frequency components outside of a band defined by the first fundamental frequency;

a second low pass filter including a first terminal coupled to said second inverted-F antenna, and configured to attenuate the frequency components outside of a band defined by said second fundamental frequency; and a high-pass filter including first and second terminals, with the first terminal coupled to said second inverted-F antenna, and having a cut-off frequency higher than the second fundamental frequency;

a first recombination element coupling the second terminals of said first and second filters to a first common terminal; and a second recombination element coupling the first common terminal and the second terminal of said high-pass filter to a second common terminal forming a single feed of the antenna circuit.

6. The antenna circuit according to claim 5, wherein the second recombination element is configured as a diplexer having a low-pass path on a side of the first common terminal and a high-pass path on a side of said high-pass filter.

7. The antenna circuit according to claim 5, wherein the first and second fundamental frequencies are within a range of 698-960 MHz.

8. The antenna circuit according to claim 5, wherein said first and second recombination elements are passive.

9. A method for making an antenna circuit comprising:
  forming a first antenna tuned to a first fundamental frequency;
  forming a second antenna configured to have two tuning frequencies, respectively a second fundamental frequency different from the first fundamental frequency and a third fundamental frequency close to a first harmonic of the first or second fundamental frequency;
  forming a first filter to include a first terminal, with the first terminal connected to the first antenna, and configured to attenuate frequency components outside of a band defined by the first fundamental frequency;
  forming a second filter to include a first terminal coupled to the second antenna, and configured to attenuate the frequency components outside of a band defined by the second fundamental frequency;
  forming a first passive recombination element, with the first passive recombination element coupled to the second terminals of the first and second filters to a first common terminal;
  forming a passive high-pass filter to include first and second terminals, with the first terminal coupled to the second antenna, and having a cut-off frequency higher than the second fundamental frequency; and
  forming a second passive recombination element, with the second passive recombination element coupling the first common terminal and the second terminal of the high-pass filter to a second common terminal to form a single feed of the antenna circuit.

10. The method according to claim 9, wherein the second passive recombination element is configured as a diplexer having a low-pass path on a side of the first common terminal and a high-pass path on a side of the high-pass filter.

11. The method according to claim 9, wherein the first and second fundamental frequencies are within a range of 698-960 MHz.

12. The method according to claim 9, wherein the first antenna comprises a first inverted-F antenna; and wherein the second antenna comprises a second inverted-F antenna.

* * * * *